United States Patent
Davis et al.

(10) Patent No.: US 7,768,441 B2
(45) Date of Patent: Aug. 3, 2010

(54) GEODESY VIA GPS AND INSAR INTEGRATION

(75) Inventors: Eric Davis, El Cerrito, CA (US); Scott Marsic, San Francisco, CA (US)

(73) Assignee: Halliburton Energy Services, Inc., Duncan, OK (US)

(*) Notice: Subject to any disclaimer, the term of this patent is extended or adjusted under 35 U.S.C. 154(b) by 0 days.

(21) Appl. No.: 12/481,241

(22) Filed: Jun. 9, 2009

(65) Prior Publication Data

US 2009/0237297 A1    Sep. 24, 2009

Related U.S. Application Data

(63) Continuation of application No. 12/026,830, filed on Feb. 6, 2008, now abandoned.

(51) Int. Cl.
  *G01S 13/90* (2006.01)
(52) U.S. Cl. .................. 342/25 R; 342/25 A; 342/25 F; 342/174; 342/189; 342/190; 342/191; 342/195
(58) Field of Classification Search ............... 342/25 R, 342/25 A–25 F, 174, 179–180, 189–191, 342/113, 123, 194–196
  See application file for complete search history.

(56) References Cited

U.S. PATENT DOCUMENTS

| | | | | |
|---|---|---|---|---|
| 4,975,704 A | * | 12/1990 | Gabriel et al. | 342/25 C |
| 5,424,743 A | * | 6/1995 | Ghiglia et al. | 342/25 C |
| 5,552,787 A | * | 9/1996 | Schuler et al. | 342/25 A |
| 5,923,278 A | * | 7/1999 | Poehler et al. | 342/25 C |
| 6,011,505 A | * | 1/2000 | Poehler et al. | 342/25 C |

(Continued)

FOREIGN PATENT DOCUMENTS

EP    409219 A2 *   1/1991

(Continued)

OTHER PUBLICATIONS

Yamanokuchi, T.; Doi, K.; Shibuya, K.; , "Combined use of InSAR and ICESat / GLAS data for high accuracy DEM generation on antarctica," Geoscience and Remote Sensing Symposium, 2007. IGARSS 2007. IEEE International , vol., no., pp. 1229-1231, Jul. 23-28, 2007.*

(Continued)

*Primary Examiner*—John B Sotomayor
(74) *Attorney, Agent, or Firm*—John W. Wustenberg; Schwegman, Lundberg & Woessner, P.A.

(57) ABSTRACT

A method for representing surface deformation measurements, including providing InSAR data, wherein the InSAR data is line of sight InSAR data; providing Global Positioning System (GPS) data; filtering the InSAR data; assembling the GPS data over a time span; resolving the GPS data into a line of sight direction; determining a correction; generating a corrected line of sight image; generating a plurality of XY motion maps, wherein generating includes: correlating a plurality of XY motions from a plurality of GPS sites with a gradient of the corrected line of site image; determining a correlation coefficient; and building a plane of XY motion using at least one of the plurality of XY motions; using the correlation coefficient to produce a linear combination of the plurality of XY motion maps; and using the linear combination to convert the InSAR data to vertical motion.

35 Claims, 8 Drawing Sheets

U.S. PATENT DOCUMENTS

| | | | |
|---|---|---|---|
| 6,046,695 A * | 4/2000 | Poehler et al. | 342/25 A |
| 6,628,844 B1 * | 9/2003 | Benitz | 382/276 |
| 6,919,839 B1 * | 7/2005 | Beadle et al. | 342/25 R |
| 7,277,797 B1 * | 10/2007 | Kunitsyn et al. | 702/15 |
| 2004/0090360 A1 * | 5/2004 | Vincent | 342/25 |
| 2007/0109177 A1 * | 5/2007 | Baath et al. | 342/124 |
| 2008/0177483 A1 * | 7/2008 | Pan et al. | 702/42 |

FOREIGN PATENT DOCUMENTS

| | | | |
|---|---|---|---|
| GB | 2411087 A | * | 8/2005 |
| WO | WO 9712257 A1 | * | 4/1997 |

OTHER PUBLICATIONS

Stebler, O.; Meier, E.; Nuesch, D.; , "Forward and inverse modelling of multi-baseline L-band Pol-InSAR E-SAR data," Geoscience and Remote Sensing Symposium, 2002. IGARSS '02. 2002 IEEE International , vol. 2, No., pp. 823-825 vol. 2, 2002.*

* cited by examiner

GEODESY VIA GPS AND INSAR INTEGRATION

RELATED APPLICATION

This application is a continuation of U.S. patent application Ser. No. 12/026,830, filed Feb. 6, 2008 now abandoned, which application is incorporated herein by reference and made a part hereof.

BACKGROUND

Interferometric Synthetic Aperture Radar (InSAR) is used to obtain high spatial resolution surface deformation maps. InSAR measurements are obtained through the post-processing of active spaceborne and airborne microwave-based imagery. While the ultimate mapping resolution of an InSAR product is impressive (30 meter pixel size for ENVISAT or ERS and less than 5 meters pixel size with RADARSAT-2), the true power of InSAR resides in its tremendous spatial coverage. A single synthetic aperture radar image has the ability to cover a roughly 100 km by 100 km area.

One limitation of InSAR is that it only provides land surface deformation information in the line of sight of the spacecraft or aircraft taking the image. This is also referred to as the "slant-range" perspective of the radar sensor. The effect of this is that InSAR technology is only able to detect motion in this one slant-range axis. This is incompatible with many surface deformation environments, which frequently manifest themselves in three axes. InSAR based slant-range motion observations result in a loss of valuable information about the true surface motion. Another shortcoming of InSAR is that it lacks an absolute reference, because it provides only the change in a surface from one time period to another. Similar to analysis of elevation using tilt measurements, this can result in a build-up of errors over time. Furthermore, within an analysis, the choice of what constitutes zero motion from one time period to another is subject to errors due to satellite positioning and atmospheric conditions. As a result, an image generated from InSAR alone is best used to gauge only relative motion between points in the image, rather than the absolute motion of any single point.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
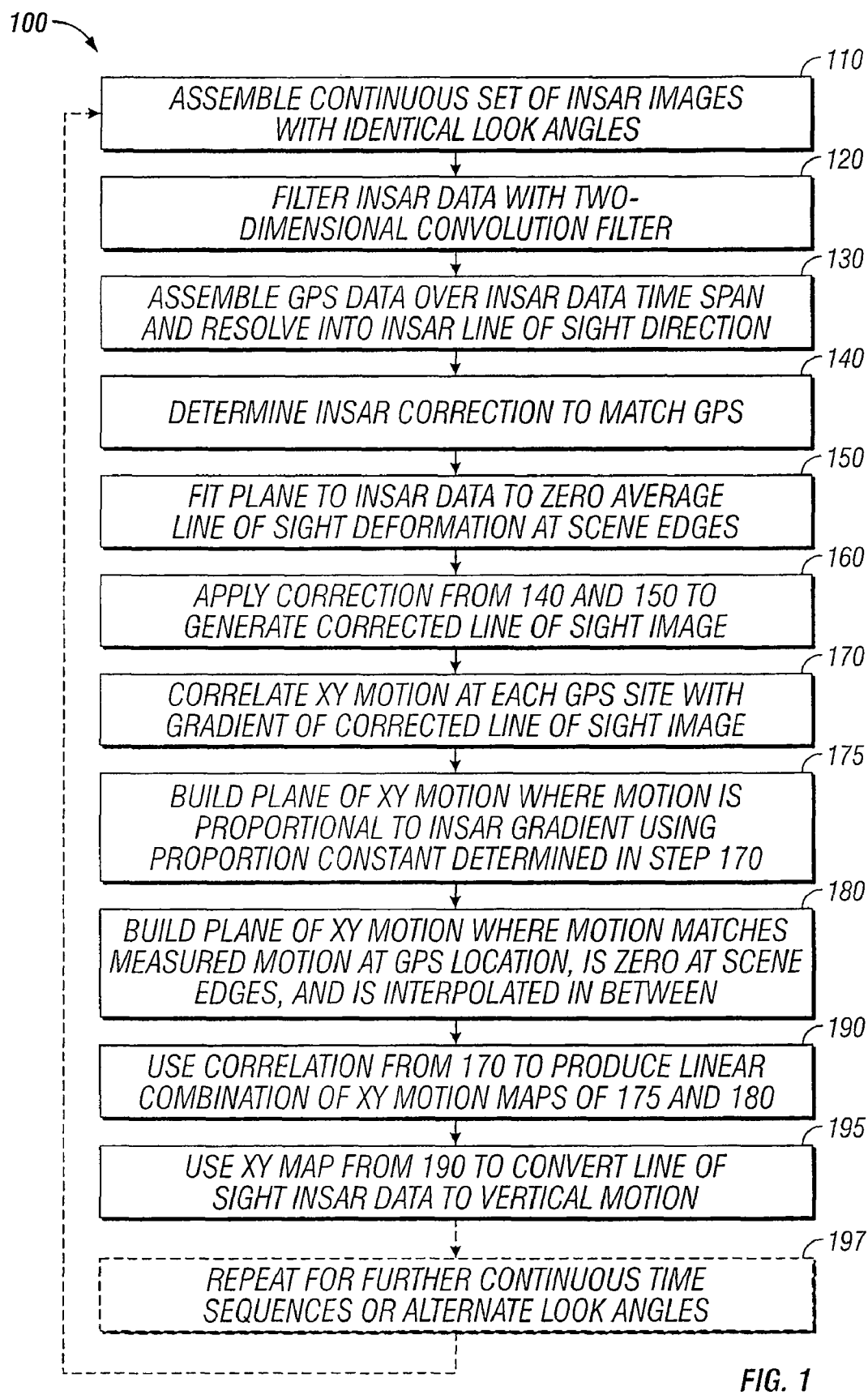
FIG. 1 is a schematic view of a flowchart depicting a method according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

InSAR and Global Positioning System (GPS) are examples of technologies that may be used to measure surface deformation. Each of these technologies has specific limitations due to their operation. However, data from each of these technologies may be combined to improve surface deformation measurements obtained from using just one of the technologies alone. This application focuses on integration of InSAR and GPS technologies.

InSAR measures motion in the line of sight direction of the spacecraft or aircraft radar sensor. When the motion is corrected to the vertical or other desired direction, certain assumptions must be made. These assumptions may significantly distort the output. Typically, if determination of vertical motion is desired, horizontal ground motion is assumed to be zero. However, this assumption may not be applicable to an entire set of data. For example, in landslide applications, the ground motion may be assumed to run in the downhill direction, even though this is generally not the case across the whole slide. In addition, InSAR is subject to significant error due to signal delay through the troposphere. Changes in water level in the troposphere between surveys may cause false readings, which may not be readily detected and removed prior to data processing.

GPS technology utilizes a satellite-based system that allows for a precise determination of location anywhere on or above the Earth's surface. There are currently 31 Block II/IIA/IIR/IIR M satellites operating as part of the GPS constellation. Survey-grade receivers combined with advanced differential signal processing techniques allow 3-D GPS motion observables to be continually produced with accuracies of 1½-2 millimeters or less. GPS has become a primary tool for studying a wide range of geomechanical motion including, but not limited to, fluid injection, subsidence, deformations of volcanic and tectonic origin, mass wasting, glacial flow, and other phenomena requiring stable and precise measurements of small surface motions.

GPS signals, unlike InSAR signals, are far less subject to error from tropospheric delays due to the fact that GPS signals and InSAR signals use different frequencies. However, GPS signals are more subject to errors from delays in the ionosphere. To overcome this limitation, data from multiple GPS sites may be processed using a triple difference processing algorithm to remove these errors. The result is that for nearly all cases, GPS based deformation measurements have significantly smaller uncertainty than InSAR based measurements.

According to one or more aspects of the present disclosure, high resolution GPS stations capable of providing sub-centimeter sensitivity with continuous, automated operation, may be integrated with InSAR measurement technology to improve the accuracy of surface deformation measurements. The long-term stability of GPS, and the fact that it constitutes a direct measurement of position, makes it an ideal source of ground truth for constraining the unknowns or potential sources of instability inherent in conventional measurement techniques, such as InSAR.

FIG. 1 is a flow-chart diagram of an exemplary embodiment of a method 100 according to one or more aspects of the present disclosure. The method 100 includes a step 110 wherein a continuous set of InSAR images that use the same beam mode are assembled into a single assembly of InSAR data. According to an exemplary embodiment, if all images in the series for the desired time span use the same beam mode, only one assembly is assembled. If an additional beam mode is introduced into the embodiment, the number of unknown motion parameters that must be solved (vertical, easting, northing) is reduced by one, thereby effectively increasing the robustness of the solution. Nevertheless, integration of InSAR and GPS can proceed with either one or two beam mode contributions.

Figure 2:
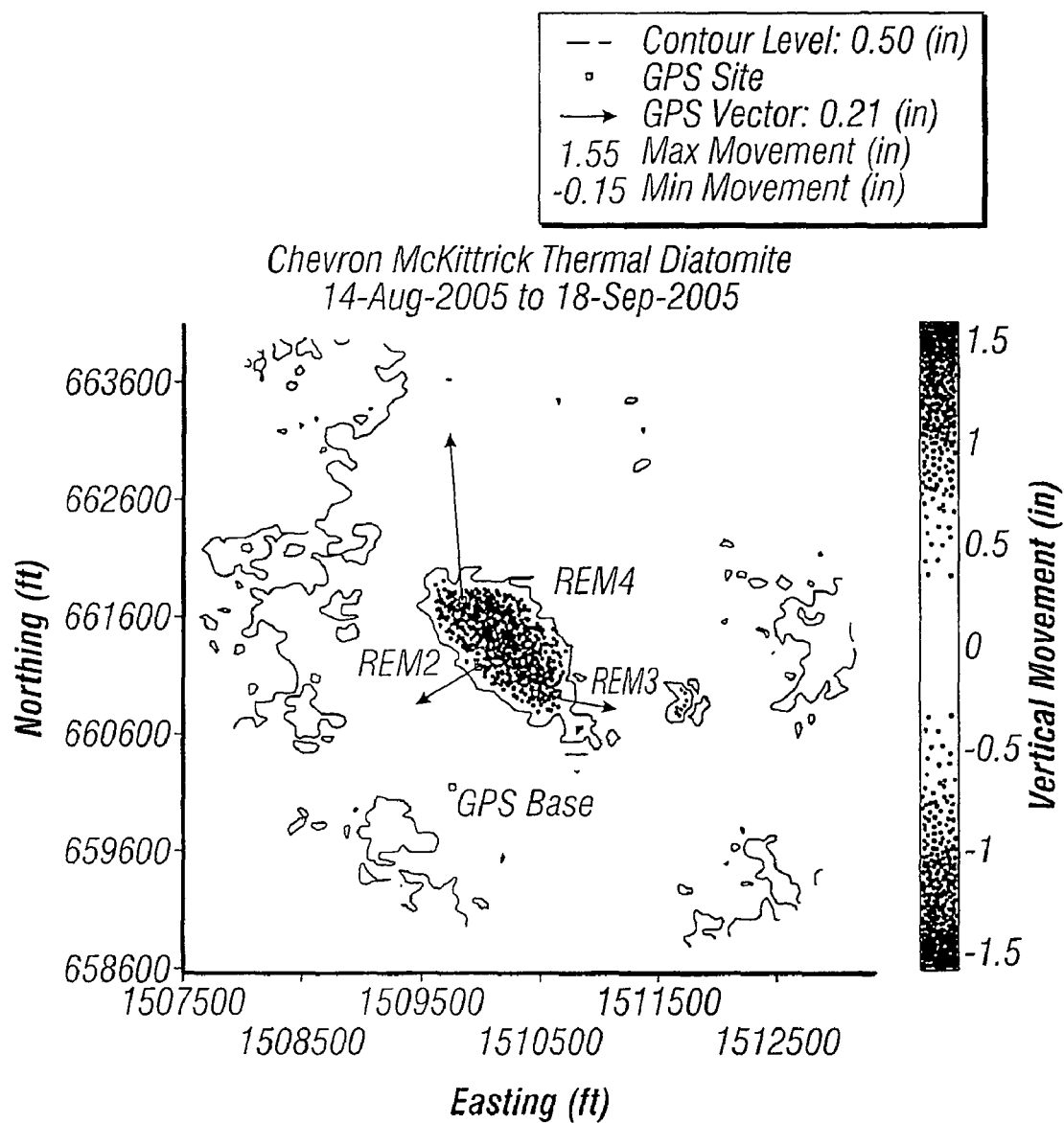
FIG. 2 is an original, unfiltered, vertically projected InSAR image according to one or more aspects of the present disclosure.

Referring now to FIG. 2, an original unfiltered, uncorrected InSAR image is shown. The original InSAR image shown in FIG. 2 shows line of sight data corrected to the vertical direction assuming no horizontal motion. Note that the vertical correction signifies that that the raw line of sight InSAR observables are projected into a vertical plane. This makes the assumption that no horizontal motion is present within the deformation field, which may not be true for many monitoring applications.

Referring back to FIG. 1, in a step 120, the InSAR data is filtered using a two dimensional convolution filter. According to an exemplary embodiment, the convolution filter removes high frequency deformations, including deviant readings and movements associated with underground sources shallower than the specified minimum monitoring depth for a given field. Fitting a point correction factor to a deviant reading will result in an incorrect offset applied to a large area. Filtering the InSAR data prevents improper fitting of GPS motions to a possible outlier in the InSAR deformation field.

If desired, the difference between the filtered and unfiltered images can be added back in at the end of the correction process. For example, a user may want the final InSAR image to include all the original detail of the InSAR image, some of which is removed by the filter. Such details may be useful for looking at the motion of objects down to the resolution scale of the data. According to an exemplary embodiment, adding the difference between the filtered and unfiltered images back in includes subtracting the deformation of the filtered image from the original image on a pixel by pixel basis. After the filtered image is corrected using the process described above, that difference may be added back into the corrected filtered image, again on a pixel by pixel basis.

Figure 3:
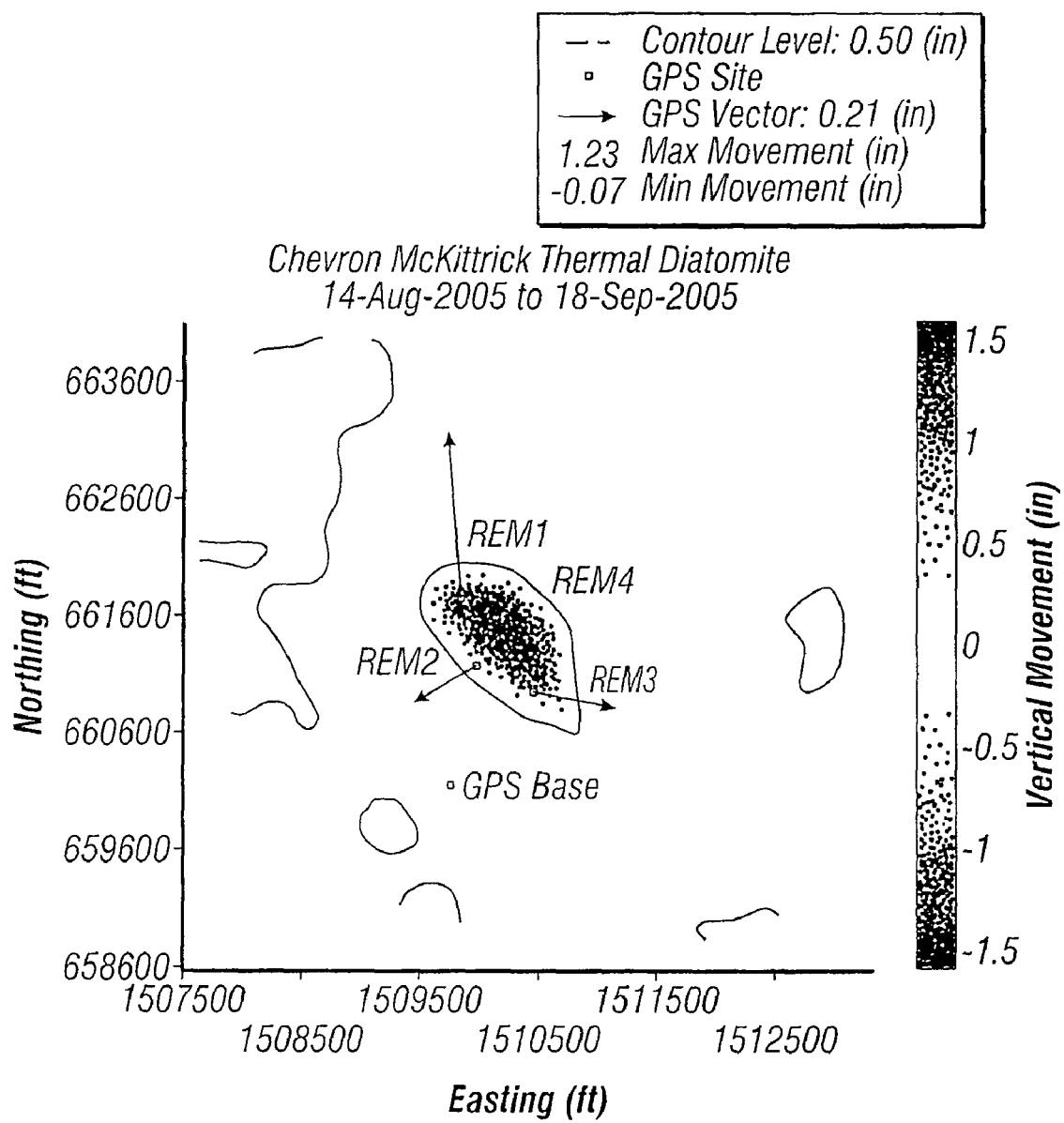
FIG. 3 is a filtered, vertically projected InSAR image with no GPS correction according to one or more aspects of the present disclosure.

The filter size used to produce the filtered image may be matched to the frequency of motion under investigation. According to an exemplary embodiment, the filter is cone shaped. In a second exemplary embodiment, the filter is a Gaussian shape. Referring briefly to FIG. 3, a filtered InSAR image with no GPS correction is shown. FIG. 3 represents the same data as FIG. 2, but has been filtered by the convolution filter to remove high frequency motion. This allows comparison of the GPS measured movement to the InSAR measured movement without concern that a stray reading right at a GPS location will adversely affect the results.

Now, referring back to FIG. 1, in a step 130, GPS data may be assembled over the same time span as the InSAR data and resolved into a line of sight direction represented by the InSAR data. In step 140, a correction to the InSAR data may be determined in order to match the InSAR data to the GPS data at the locations where GPS measurements are available. The correction is further determined in step 150, wherein a plane may be fit to the InSAR data so that the average line of sight deformation around the edge of the scene being monitored, as determined by a user, equals zero. Because the correction is a linear interpolation between the scene edge and the GPS locations, improved results may be obtained by defining a scene edge that best represents the closest locations to the area being monitored that can be safely assumed to have zero deformation. According to an exemplary embodiment, the values of the plane at the edge points may be used as an additional factor in determining the correction. Step 150 provides a basis for limiting the area of influence of the GPS correction with the assumption that the scene extends beyond the region influenced by whatever is being monitored. Note that deformation is still allowed at the perimeter, and that only the average line of sight deformation around the edge of the scene is set to zero.

Figure 4:
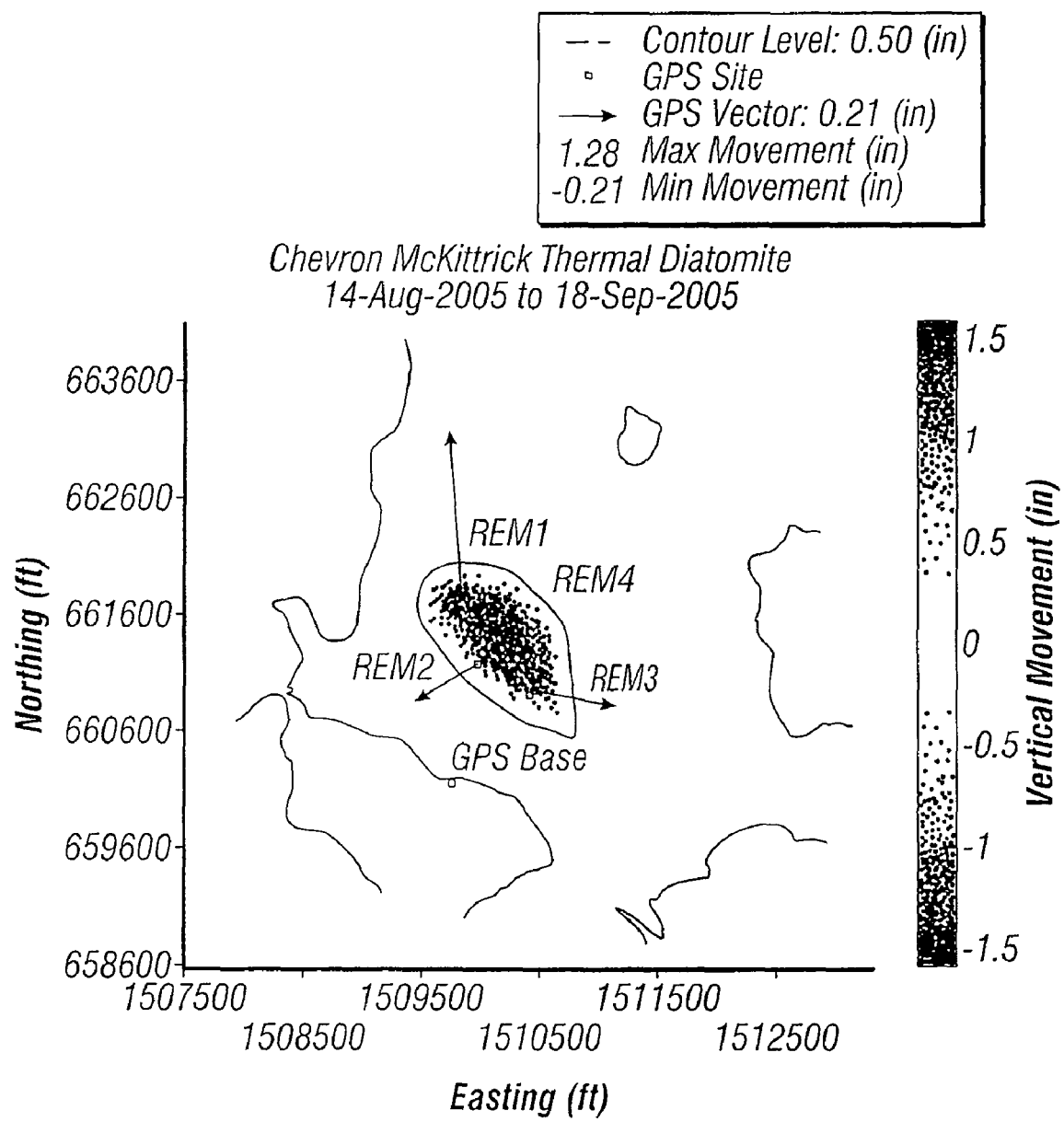
FIG. 4 is an InSAR image corrected using GPS constraints according to one or more aspects of the present disclosure.
Figure 5:
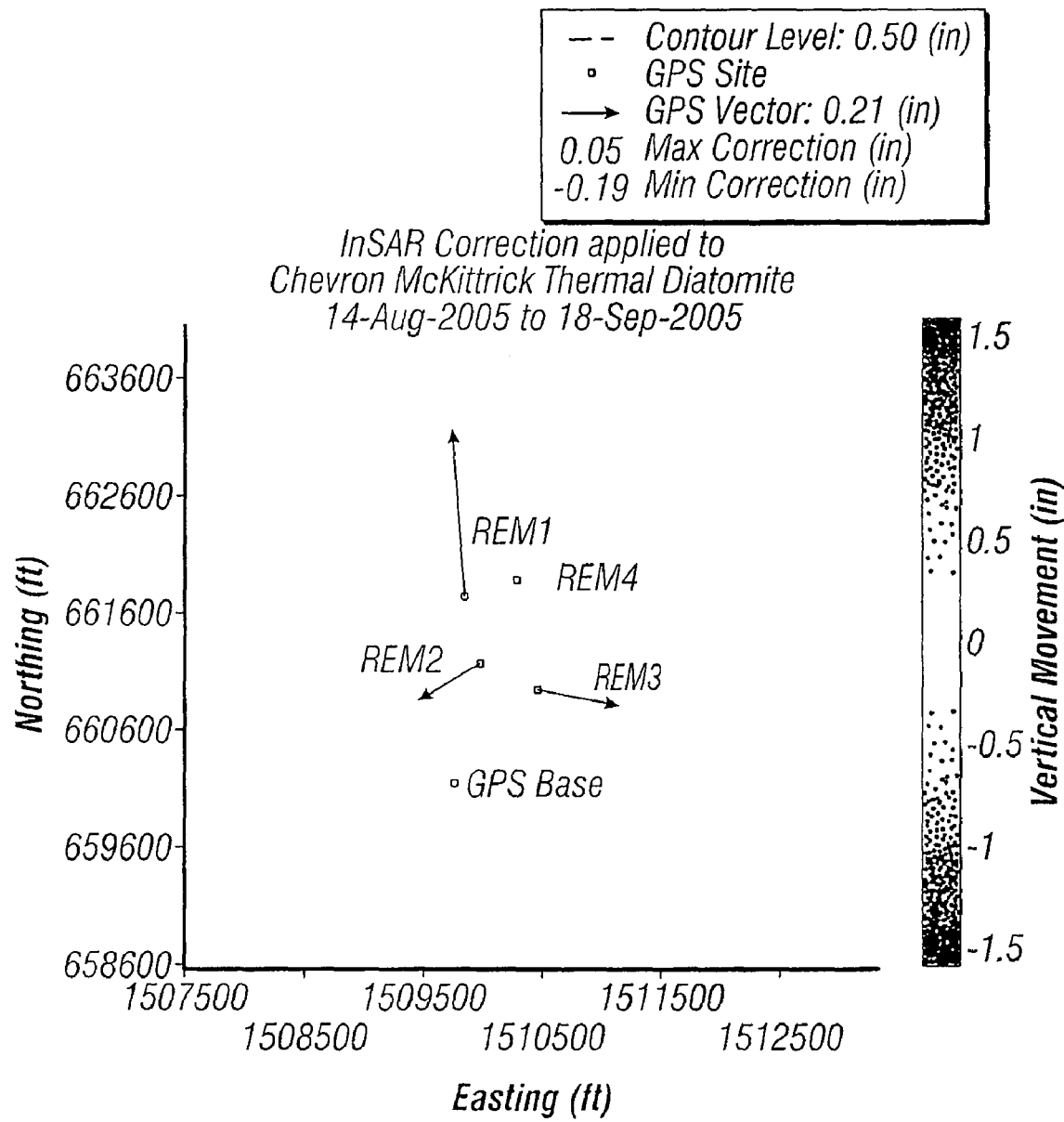
FIG. 5 is an InSAR image with the vertical GPS data correction applied according to one or more aspects of the present disclosure.

Subsequently, in step 160, the correction, as determined in steps 140 and 150, may be applied to the InSAR data using a minimally curved surface between known points. Application of the correction results in a corrected line of sight image. FIG. 5 shows an image of a correction that may be applied to InSAR data. The surface in FIG. 5 is the correction surface generated in steps 140 and 150. FIG. 4 shows an image produced by adding FIG. 5 to FIG. 3, resulting in filtered InSAR line of sight data that has been adjusted to match the measured GPS data and the assumption of zero average motion around the scene perimeter. The grayscale variance represents vertical displacement, and the arrows depict the direction and magnitude of lateral displacement.

Referring again to FIG. 1, step 170 is the first step in generating XY motion maps. In a step 170, the XY motion at each GPS site is correlated with the gradient of the corrected line of site image. According to an exemplary embodiment, the correlation is done for both the motion magnitude and direction. In an exemplary embodiment, the gradient of the corrected line of sight image is taken and compared to the easting and northing motion of the GPS. Smoothness may be improved by using a first order fit and forcing the gradient correlation to pass through coordinate (0,0) of an XY motion map. A correlation coefficient may be determined from the fit. According to an exemplary embodiment, the correlation coefficient is a percentage that represents how dependent the calculation of the XY motion will be upon the gradient of the corrected line of site image. For instance, with perfect correlation, the assumed XY motion will come entirely from the image gradient. If there is no correlation, the gradient information will not be used. Negative correlation is allowed.

Figure 6:
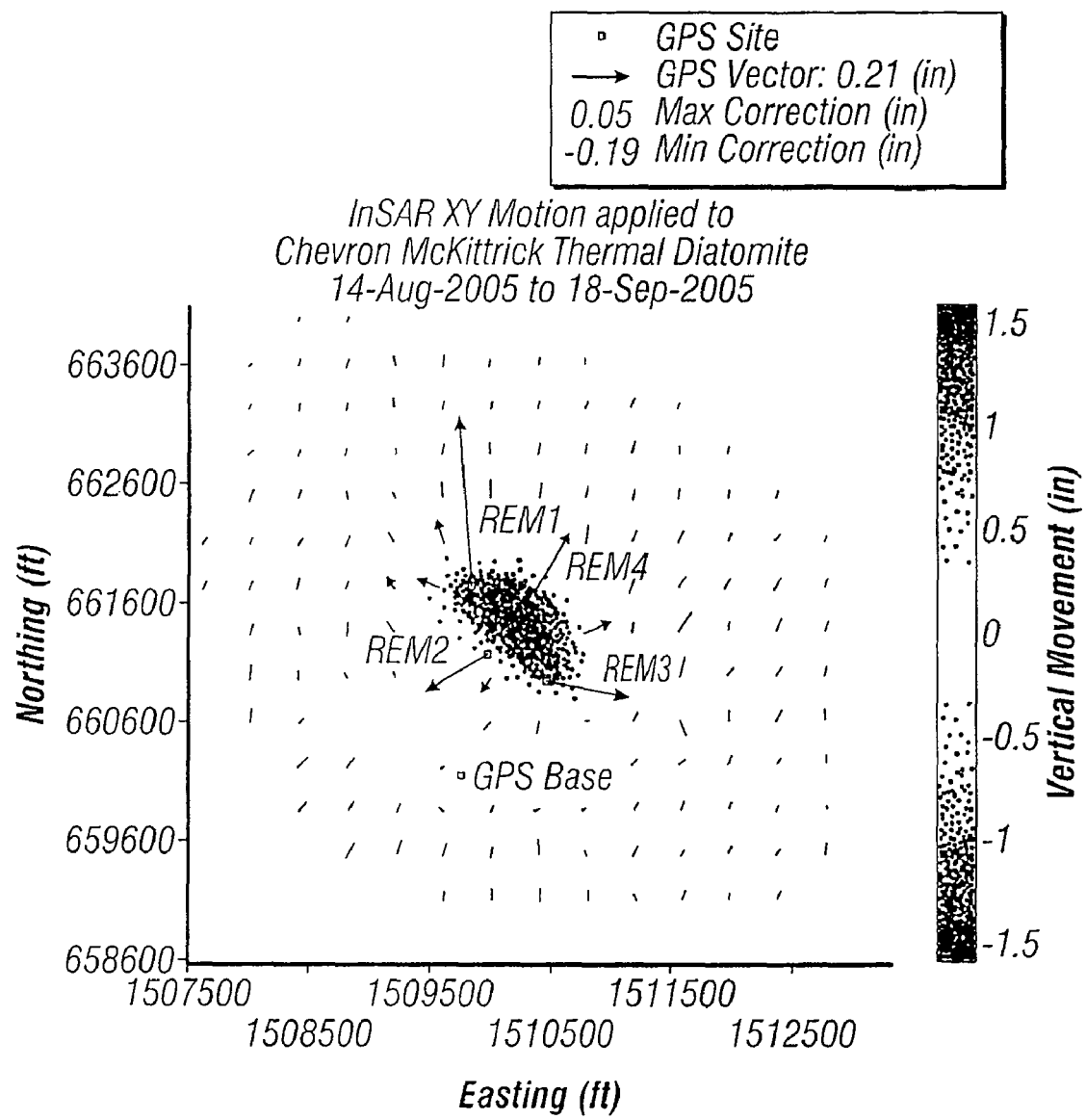
FIG. 6 is a map of calculated XY motion according to one or more aspects of the present disclosure.

Next in step 180, a plane of XY motion is built for each XY motion map using only the XY motion measured at the GPS sites, plus an assumption of zero XY motion around the scene perimeter, and interpolated between the GPS sites and the scene perimeter. Then in step 190, the correlation coefficient calculated in step 170 is used to produce a linear combination of the XY motion maps developed in steps 170 and 180. In step 195, the linear combination of the XY motion maps created in step 190 is used to convert the line of sight InSAR data to vertical motion. FIG. 6 shows a map of assumed XY motion that may be used to convert the line of sight InSAR data to vertical motion.

In an exemplary embodiment, an optional step 197 repeats steps 170 through 195 in order to process additional continuous time sequences and/or alternate look angles. According to another exemplary embodiment, steps 170 through 195 may also be iterated so that the gradient can be taken from the vertical direction instead of the line of sight deformation. Iteration may be necessary in order to take the gradient from the vertical direction because the vertical direction cannot be resolved without the XY motion.

Figure 7:
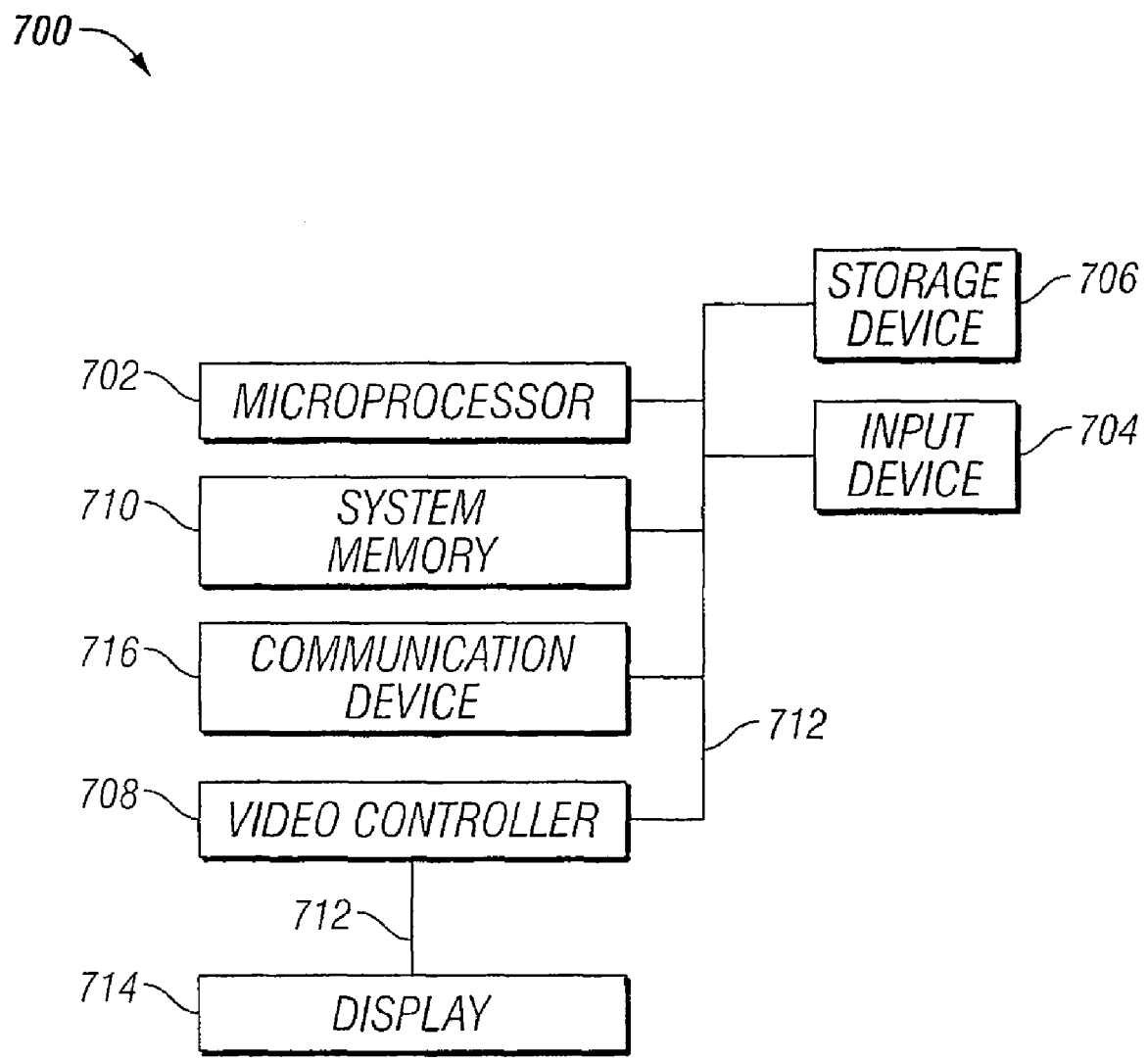
FIG. 7 is a schematic view of an apparatus according to one or more aspects of the present disclosure.

It will also be understood by those having skill in the art that one or more (including all) of the elements/steps of the present invention may be implemented using software executed on a general purpose computer system or networked computer systems, using special purpose hardware based computer systems, or using combinations of special purpose hardware and software. Referring to FIG. 7, an illustrative node 700 for implementing an embodiment of the method is depicted. Node 700 includes a microprocessor 702, an input device 704, a storage device 706, a video controller 708, a system memory 710, a display 714, and a communication device 716 all interconnected by one or more buses 712. The storage device 706 could be a floppy drive, hard drive, CD-ROM, optical drive, or any other form of storage device. In addition, the storage device 706 may be capable of receiving a floppy disk, CD-ROM, DVD-ROM, or any other form of computer-readable medium that may contain computer-executable instructions. Further, communication device 716 could be a modem, network card, or any other device to enable the node to communicate with other nodes. It is understood that any node could represent a plurality of interconnected (whether by intranet or Internet) computer systems, including without limitation, personal computers, mainframes, PDAs, and cell phones.

A computer system typically includes at least hardware capable of executing machine readable instructions, as well as the software for executing acts (typically machine-readable instructions) that produce a desired result. In addition, a computer system may include hybrids of hardware and software, as well as computer sub-systems.

Hardware generally includes at least processor-capable platforms, such as client-machines (also known as personal computers or servers), and hand-held processing devices (such as smart phones, personal digital assistants (PDAs), or personal computing devices (PCDs), for example). Further, hardware may include any physical device that is capable of storing machine-readable instructions, such as memory or other data storage devices. Other forms of hardware include hardware sub-systems, including transfer devices such as modems, modem cards, ports, and port cards, for example.

Software includes any machine code stored in any memory medium, such as RAM or ROM, and machine code stored on other devices (such as floppy disks, flash memory, or a CD ROM, for example). Software may include source or object code, for example. In addition, software encompasses any set of instructions capable of being executed in a client machine or server.

Combinations of software and hardware could also be used for providing enhanced functionality and performance for certain embodiments of the disclosed invention. One example is to directly manufacture software functions into a silicon chip. Accordingly, it should be understood that combinations of hardware and software are also included within the definition of a computer system and are thus envisioned by the invention as possible equivalent structures and equivalent methods.

Computer-readable mediums include passive data storage, such as a random access memory (RAM) as well as semi-permanent data storage such as a compact disk read only memory (CD-ROM). In addition, an embodiment of the invention may be embodied in the RAM of a computer to transform a standard computer into a new specific computing machine.

Data structures are defined organizations of data that may enable an embodiment of the invention. For example, a data structure may provide an organization of data, or an organization of executable code. Data signals could be carried across transmission mediums and store and transport various data structures, and, thus, may be used to transport an embodiment of the invention.

The system may be designed to work on any specific architecture. For example, the system may be executed on a single computer, local area networks, client-server networks, wide area networks, internets, hand-held and other portable and wireless devices and networks.

A database may be any standard or proprietary database software, such as Oracle, Microsoft Access, SyBase, or DBase II, for example. The database may have fields, records, data, and other database elements that may be associated through database specific software. Additionally, data may be mapped. Mapping is the process of associating one data entry with another data entry. For example, the data contained in the location of a character file can be mapped to a field in a second table. The physical location of the database is not limiting, and the database may be distributed. For example, the database may exist remotely from the server, and run on a separate platform. Further, the database may be accessible across the Internet. Note that more than one database may be implemented.

Figure 8:
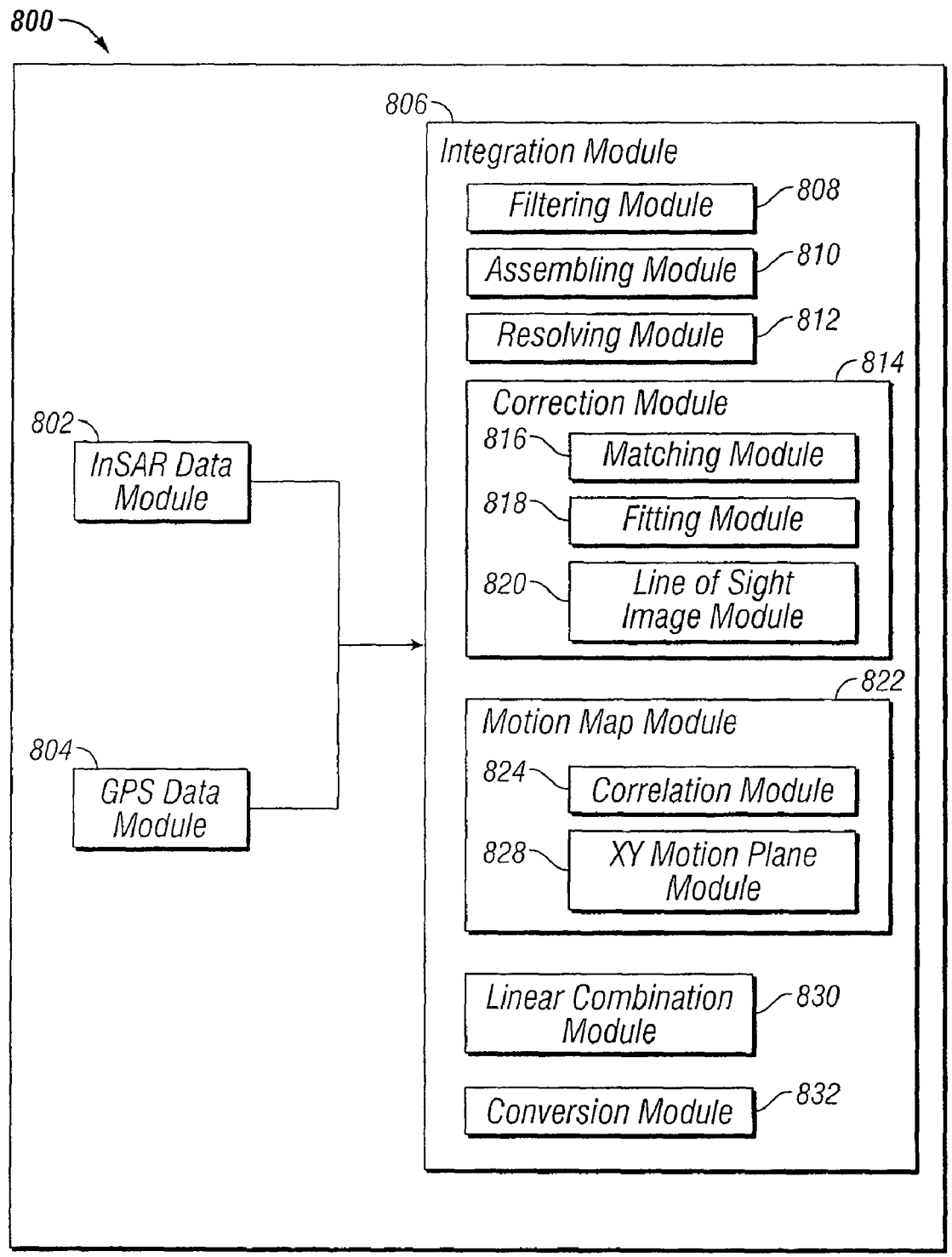
FIG. 8 is a schematic view of a system according to one or more aspects of the present disclosure.

Referring now to FIG. 8, an embodiment of a system 800 for integrating InSAR and GPS data is shown. According to an exemplary embodiment, an InSAR data module 802 provides InSAR data to an integration module 806, and a GPS data module 804 provides GPS data to a integration module 806. An exemplary embodiment of the integration module 806 performs operations on the InSAR and GPS data using a method for integrating InSAR and GPS data, such as the method 100 described in FIG. 1 of the present disclosure. According to an exemplary embodiment, the integration module 806 includes a filtering module 808 configured to the step 120 of the method 100 described in FIG. 1 of the present disclosure. The integration module 806 may further include an assembling module 810 configured to execute step 130 of the method 100 described in FIG. 1 of the present disclosure. Further, the integration module 806 may also include a resolving module 812 that implements step 120 of the method 100 described in FIG. 1 of the present disclosure.

The integration module 806 may also include a correction module 814 configured to execute the steps 140-160 of the method 100 described in FIG. 1 of the present disclosure. According to an exemplary embodiment, the correction module 814 includes a matching module 816, a fitting module 818 and a line of sight module 820. The matching module 816 may be configured to execute step 140 of the method 100 described in FIG. 1 of the present disclosure. The fitting module 818 may be configured to execute step 150 of the method 100 described in FIG. 1 of the present disclosure. The line of sight image module 820 may be configured to execute the step 160 of the method 100 described in FIG. 1 of the present disclosure.

The integration module 806 may also include a motion map module 822 configured to execute the steps 170-180 of the method 100 described in FIG. 1 of the present disclosure. According to an exemplary embodiment, the motion map module 822 includes a correlation module 824 and a XY Motion Plan Module 828. The correlation module 824 may be configured to execute the step 170 of the method 100 described in FIG. 1 of the present disclosure. The XY motion plane module 828 may be configured to execute the step 180 of the method 100 described in FIG. 1 of the present disclosure.

The integration module 806 may also include a linear combination module 830 configured to execute the step 190 of the method 100 described in FIG. 1 of the present disclosure. Finally, the integration module may also include a conversion module 832 configured to execute the step 195 of the method 100 described in FIG. 1 of the present disclosure.

An embodiment of a method for representing surface deformation measurements in accordance with the present disclosure includes providing InSAR data, wherein the InSAR data is line of sight InSAR data; providing Global Positioning System (GPS) data; filtering the InSAR data using a two dimensional convolution filter; assembling the GPS data over a time span that matches the InSAR data; resolving the GPS data into a line of sight direction represented by the InSAR data; determining a correction, wherein determining the correction includes: matching the InSAR data with the GPS data at one or more correction points along the line of sight direction; and fitting a plane to the InSAR data, wherein the plane makes an average line of sight deformation around an edge of a scene represented by the InSAR data equal to zero; generating a corrected line of sight image, wherein the generating includes applying the correction to the InSAR data using a minimally curved surface between a plurality of known points; generating a plurality of XY motion maps, wherein generating includes: correlating a plurality of XY motions from a plurality of GPS sites with a gradient of the corrected line of site image; determining a correlation coefficient, wherein the correlation coefficient is a percentage that represents how dependent calculation of the XY motion will be upon the gradient of the corrected line of site image; and building a plane of XY motion using at least one of the plurality of XY motions; using the correlation coefficient to produce a linear combination of the plurality of XY motion maps; and using the linear combination to convert the InSAR data to vertical motion.

The present disclosure also introduces a computer program product embodied on a computer-usable medium, the medium having stored thereon a sequence of instructions which, when executed by a processor, causes the processor to execute a method for representing surface deformation measurements, the method including providing InSAR data, wherein the InSAR data is line of sight InSAR data; providing Global Positioning System (GPS) data; filtering the InSAR data using a two dimensional convolution filter; assembling the GPS data over a time span that matches the InSAR data; resolving the GPS data into a line of sight direction represented by the InSAR data; determining a correction, wherein determining the correction includes: matching the InSAR data with the GPS data at one or more correction points along the line of sight direction; and fitting a plane to the InSAR data, wherein the plane makes an average line of sight deformation around an edge of a scene represented by the InSAR data equal to zero; generating a corrected line of sight image, wherein the generating includes applying the correction to the InSAR data using a minimally curved surface between a plurality of known points; generating a plurality of XY motion maps, wherein generating includes: correlating a plurality of XY motions from a plurality of GPS sites with a gradient of the corrected line of site image; determining a correlation coefficient, wherein the correlation coefficient is a percentage that represents how dependent calculation of the XY motion will be upon the gradient of the corrected line of site image; and building a plane of XY motion using at least one of the plurality of XY motions; using the correlation coefficient to produce a linear combination of the plurality of XY motion maps; and using the linear combination to convert the InSAR data to vertical motion.

The present disclosure also introduces a method for refining surface deformation measurements, including means for providing InSAR data, wherein the InSAR data is line of sight InSAR data; means for providing Global Positioning System (GPS) data; means for filtering the InSAR data using a two dimensional convolution filter; means for assembling the GPS data over a time span that matches the InSAR data; means for resolving the GPS data into a line of sight direction represented by the InSAR data; means for determining a correction, wherein determining the correction includes: means for matching the InSAR data with the GPS data at one or more correction points along the line of sight direction; and means for fitting a plane to the InSAR data, wherein the plane makes an average line of sight deformation around an edge of a scene represented by the InSAR data equal to zero; means for generating a corrected line of sight image, wherein the generating includes applying the correction to the InSAR data using a minimally curved surface between a plurality of known points; means for generating a plurality of XY motion maps, wherein generating includes: means for correlating a plurality of XY motions from a plurality of GPS sites with a gradient of the corrected line of site image; means for determining a correlation coefficient, wherein the correlation coefficient is a percentage that represents how dependent calculation of the XY motion will be upon the gradient of the corrected line of site image; and means for building a plane of XY motion using at least one of the plurality of XY motions; means for using the correlation coefficient to produce a linear combination of the plurality of XY motion maps; and means for using the linear combination to convert the InSAR data to vertical motion.

The present disclosure also introduces a system for refining surface deformation measurements, including a first module configured to provide InSAR data, wherein the InSAR data is line of sight InSAR data; a second module configured to provide Global Positioning System (GPS) data; a third module communicably coupled to the first and second module configured to perform operations on the first and second modules, wherein the operations include: filtering the InSAR data using a two dimensional convolution filter; assembling the GPS data over a time span that matches the InSAR data; resolving the GPS data into a line of sight direction represented by the InSAR data; determining a correction, wherein determining the correction includes: matching the InSAR data with the GPS data at one or more correction points along the line of sight direction; and fitting a plane to the InSAR data, wherein the plane makes an average line of sight deformation around an edge of a scene represented by the InSAR data equal to zero; generating a corrected line of sight image, wherein the generating includes applying the correction to the InSAR data using a minimally curved surface between a plurality of known points; generating a plurality of XY motion maps, wherein generating includes: correlating a plurality of XY motions from a plurality of GPS sites with a gradient of the corrected line of site image; determining a correlation coefficient, wherein the correlation coefficient is a percentage that represents how dependent calculation of the XY motion will be upon the gradient of the corrected line of site image; and building a plane of XY motion using at least one of the plurality of XY motions; using the correlation coefficient to produce a linear combination of the plurality of XY motion maps; and using the linear combination to convert the InSAR data to vertical motion.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A method for refining surface deformation measurements, comprising:
   providing InSAR data, wherein the InSAR data is line of sight InSAR data;
   providing Global Positioning System (GPS) data;
   filtering the InSAR data using a two dimensional convolution filter;
   assembling the GPS data over a time span that matches the InSAR data;
   resolving the GPS data into a line of sight direction represented by the InSAR data;
   determining a correction, wherein determining the correction includes:
      matching the InSAR data with the GPS data at one or more correction points along the line of sight direction; and
      fitting a plane to the InSAR data, wherein the plane makes an average line of sight deformation around an edge of a scene represented by the InSAR data equal to zero;
   generating a corrected line of sight image, wherein the generating includes applying the correction to the InSAR data using a minimally curved surface between a plurality of known points;
   generating a plurality of XY motion maps, wherein generating includes:
      correlating a plurality of XY motions from a plurality of GPS sites with a gradient of the corrected line of site image;
      determining a correlation coefficient, wherein the correlation coefficient is a percentage that represents how dependent calculation of the XY motion will be upon the gradient of the corrected line of site image; and
      building a plane of XY motion using at least one of the plurality of XY motions;
   using the correlation coefficient to produce a linear combination of the plurality of XY motion maps; and
   using the linear combination to convert the InSAR data to vertical motion.

2. The method of claim 1 further comprising adding a differential image to the InSAR data, wherein the differential image represents a difference between the InSAR data prior to filtering and the InSAR data after filtering.

3. The method of claim 1 wherein the filter is at least one of a cone shape and a Gaussian shape.

4. The method of claim 1 wherein fitting a plane to the InSAR data further includes using one or more edge points of the plane as an additional correction factor.

5. The method of claim 1 wherein the correlating is performed for both a motion magnitude and a direction.

6. The method of claim 1 wherein the gradient of the corrected line of site image is taken from the line of sight deformation.

7. The method of claim 1 wherein the gradient of the corrected line of site image is taken from a vertical direction.

8. The method of claim 1 wherein correlating a plurality of XY motions includes using a first order fit and forcing the gradient of the corrected line of site image to pass through a coordinate (0,0) of the XY map.

9. The method of claim 1 wherein building a plane of XY motion includes:
   using only the XY motion measured at the GPS sites;
   assuming a zero XY motion around the scene perimeter; and
   interpolating XY motion between the GPS sites and the scene perimeter.

10. A method comprising:
   determining a surface deformation map that includes motion along a slant-range axis that is offset from a horizontal axis and a vertical axis;
   receiving data defining at least one land location within an area that is within the surface deformation map, wherein the data defining the at least one land location comprises more than one axis motion of the at least one land location;
   converting the motion along the slant-range axis of the surface deformation map to vertical motion, using the more than one axis motion of the at least one land location; and
   correcting the surface deformation map using the vertical motion derived from the motion along the slant-range axis.

11. The method of claim 10, wherein the more than one axis motion comprises a three axis motion, wherein the three axis motion includes two horizontal motion axes and a vertical motion axis.

12. The method of claim 10, wherein the determining of the surface deformation map comprises collecting data from an airborne radar operation.

13. The method of claim 10, wherein the surface deformation map comprises a surface deformation map of a land surface.

14. The method of claim 10, wherein receiving the data defining the at least one land location comprises receiving the data from a Global Positioning System (GPS).

15. The method of claim 14, wherein the determining of the surface deformation map comprising determining the surface deformation map from Interfermetric Synthetic Aperture Radar (InSAR) data.

16. The method of claim 15, further comprising filtering the InSAR data using a two dimensional convolution filter prior to converting the motion along the slant-range axis.

17. The method of claim 16, wherein converting the motion along the slant-range axis of the surface deformation map to the vertical motion comprises determining a correction, wherein determining the correction includes:
   matching the InSAR data with the data from the GPS at one or more correction points along a line of sight direction represented by the InSAR data;
   fitting a plane to the InSAR data, wherein the plane makes an average line of sight deformation around an edge of a scene represented by the InSAR data equal to zero; and generating a corrected line of sight image, wherein the generating includes applying the correction to the InSAR data using a minimally curved surface between a plurality of known points.

18. The method of claim 17, wherein converting the motion along the slant-range axis of the surface deformation map to the vertical motion comprises generating a corrected line of sight image, wherein the generating includes applying the correction to the InSAR data using a minimally curved surface between a plurality of known points.

19. The method of claim 18, wherein converting the motion along the slant-range axis of the surface deformation map to the vertical motion comprises generating a plurality of two horizontal axis motion maps, wherein generating includes:
  correlating a plurality of two horizontal axis motions from a plurality of GPS sites with a gradient of the corrected line of sight image;
  determining a correlation coefficient, wherein the correlation coefficient is a percentage that represents how dependent calculation of the two horizontal axis motion will be upon the gradient of the corrected line of sight image; and
  building a plane of interpolated two horizontal axis motion using at least one of the plurality of two horizontal axis motions;
  using the correlation coefficient to produce a linear combination of the plurality of two horizontal axis motion maps; and
  using the linear combination to convert the InSAR data to vertical motion.

20. A computer-readable medium that provides instructions, which when executed by a machine, cause said machine to perform operations comprising:
  receiving data for surface deformation that includes motion along a slant-range axis that is offset from a horizontal axis and a vertical axis, wherein the data is received from an airborne radar operation;
  determining a surface deformation map of a land surface derived the data that includes the motion along the slant-range axis;
  receiving data along a three axis motion defining at least one land location within an area that is within the surface deformation map, using a Global Positioning System (GPS);
  converting the data that includes the motion along the slant-range axis to vertical motion, using the data along the three axis motion; and
  correcting the surface deformation map using the vertical motion derived from the motion along the slant-range axis.

21. The computer-readable medium of claim 20, wherein the airborne radar operation comprises Interfermetric Synthetic Aperture Radar.

22. The computer-readable medium of claim 20, wherein the airborne radar operation captures the at least one image using a same beam mode.

23. The computer-readable medium of claim 20, wherein the surface deformation map comprises a surface deformation map of a land surface.

24. The computer-readable medium of claim 20, wherein the determining of the surface deformation map comprising determining the surface deformation map from Interfermetric Synthetic Aperture Radar (InSAR) data.

25. The computer-readable medium of claim 24, further comprising filtering the InSAR data using a two dimensional convolution filter prior to converting the data that includes the motion along the slant-range axis.

26. The computer-readable medium of claim 25, wherein converting the data that includes the motion along the slant-range axis to the vertical motion comprises determining a correction, wherein determining the correction includes:
  matching the InSAR data with the data from the GPS at one or more correction points along a line of sight direction represented by the InSAR data;
  fitting a plane to the InSAR data, wherein the plane makes an average line of sight deformation around an edge of a scene represented by the InSAR data equal to zero; and
  generating a corrected line of sight image, wherein the generating includes applying the correction to the InSAR data using a minimally curved surface between a plurality of known points.

27. The computer-readable medium of claim 26, wherein converting the data that includes the motion along the slant-range axis to the vertical motion comprises generating a corrected line of sight image, wherein the generating includes applying the correction to the InSAR data using a minimally curved surface between a plurality of known points.

28. The computer-readable medium of claim 27, wherein converting the data that includes the motion along the slant-range axis to the vertical motion comprises generating a plurality of XY motion maps, wherein generating includes:
  correlating a plurality of XY motions from a plurality of GPS sites with a gradient of the corrected line of sight image;
  determining a correlation coefficient, wherein the correlation coefficient is a percentage that represents how dependent calculation of the XY motion will be upon the gradient of the corrected line of sight image; and
  building a plane of XY motion using at least one of the plurality of XY motions;
  using the correlation coefficient to produce a linear combination of the plurality of XY motion maps; and
  using the linear combination to convert the InSAR data to vertical motion.

29. An apparatus comprising:
  means for determining a surface deformation map that includes motion along a slant-range axis that is offset from a horizontal axis and a vertical axis;
  means for receiving data defining at least one land location within an area that is within the surface deformation map, wherein the data defining the at least one land location comprises a three axis motion that includes two horizontal motion axes and a vertical motion axis;
  means for converting the motion along the slant-range axis of the surface deformation map to vertical motion, using the more than one axis motion of the at least one land location; and
  means for correcting the surface deformation map using the vertical motion derived from the motion along the slant-range axis.

30. The apparatus of claim 29, wherein the means for determining the surface deformation map comprises means for collecting data from an airborne radar operation.

31. The apparatus of claim 29, wherein the surface deformation map comprises a surface deformation map of a land surface.

32. The apparatus of claim 29, wherein the means for receiving the data defining the at least one land location comprises receiving the data from a Global Positioning System (GPS).

33. The apparatus of claim 32, wherein the means for determining the surface deformation map comprising means for determining the surface deformation map from Interfermetric Synthetic Aperture Radar (InSAR) data.

34. The apparatus of claim 33, further comprising means for filtering the InSAR data using a two dimensional convolution filter.

35. The apparatus of claim 34, wherein the means for converting the motion along the slant-range axis of the surface deformation map to the vertical motion comprises means for determining a correction, wherein the means for determining the correction includes:

means for matching the InSAR data with the data from the GPS at one or more correction points along a line of sight direction represented by the InSAR data;

means for fitting a plane to the InSAR data, wherein the plane makes an average line of sight deformation around an edge of a scene represented by the InSAR data equal to zero; and means for generating a corrected line of sight image, wherein the generating includes applying the correction to the InSAR data using a minimally curved surface between a plurality of known points.

* * * * *